(12) United States Patent
Park et al.

(10) Patent No.: US 10,964,319 B2
(45) Date of Patent: Mar. 30, 2021

(54) ELECTRONIC DEVICE AND METHOD OF CONTROLLING THE SAME

(71) Applicant: LG ELECTRONICS INC., Seoul (KR)

(72) Inventors: Jaeyong Park, Seoul (KR); Sumi Kim, Seoul (KR); Minseok Hwangbo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 16/007,700

(22) Filed: Jun. 13, 2018

(65) Prior Publication Data

US 2019/0214002 A1    Jul. 11, 2019

(30) Foreign Application Priority Data

Jan. 9, 2018  (KR) .................. 10-2018-0002931

(51) Int. Cl.
*G10L 15/22*    (2006.01)
*G10L 15/30*    (2013.01)
(Continued)

(52) U.S. Cl.
CPC .............. *G10L 15/22* (2013.01); *G06F 3/167* (2013.01); *G10L 15/08* (2013.01); *G10L 15/30* (2013.01);
(Continued)

(58) Field of Classification Search
CPC .............. G10L 15/22; G10L 2015/088; G10L 2015/223; G10L 15/08; G10L 15/26;
(Continued)

(56) References Cited

U.S. PATENT DOCUMENTS 9,691,378 B1 *  6/2017  Meyers .................. G10L 15/04
10,192,546 B1 *  1/2019  Piersol .................... G10L 15/08
(Continued)

FOREIGN PATENT DOCUMENTS

WO    2017197186    11/2017

OTHER PUBLICATIONS

European Patent Office Application Serial No. 18187759.8, Communication Under EPC (Notice of Allowance) dated Apr. 21, 2020, 5 pages.

(Continued)

*Primary Examiner* — Richemond Dorvil
*Assistant Examiner* — Rodrigo A Chavez
(74) *Attorney, Agent, or Firm* — Lee, Hong, Degerman, Kang & Waimey

(57) ABSTRACT

An electronic device includes: a communication unit performing communication with a preset voice recognition server; a microphone receiving voice information; and a controller executing a specific function on the basis of voice information received through the microphone, wherein after voice information is received through the microphone, the controller determines whether a wake-up word is detected within a preset time, and when the wake-up word is detected within the preset time, the controller performs voice recognition on the voice information received before the wake-up word is detected, and when the wake-up word is not detected within the preset time, the controller does not perform voice recognition on the voice information received before the wake-up word is detected.

17 Claims, 9 Drawing Sheets

(51) Int. Cl.
*G10L 15/08* (2006.01)
*G06F 3/16* (2006.01)

(52) U.S. Cl.
CPC .. *G10L 2015/088* (2013.01); *G10L 2015/223* (2013.01)

(58) Field of Classification Search
CPC ... G10L 17/22; G10L 15/265; G10L 15/1822; G10L 15/20; G10L 17/005; G10L 15/1815; G10L 15/04; G10L 21/0232; G10L 15/05; G10L 25/21; G10L 25/78; G10L 25/93; G06F 3/167
USPC .............................................. 704/9, 251, 275
See application file for complete search history.

(56) References Cited

U.S. PATENT DOCUMENTS

| | | | |
|---|---|---|---|
| 10,365,887 B1* | 7/2019 | Mulherkar | G06F 3/167 |
| 10,510,340 B1* | 12/2019 | Fu | G10L 15/22 |
| 2014/0222436 A1 | 8/2014 | Binder et al. | |
| 2014/0281628 A1 | 9/2014 | Nigam et al. | |
| 2017/0293466 A1 | 10/2017 | Bostick et al. | |
| 2018/0233139 A1* | 8/2018 | Finkelstein | G06F 1/3206 |
| 2018/0357998 A1* | 12/2018 | Georges | G10L 15/14 |
| 2019/0214011 A1* | 7/2019 | Shin | G10L 15/22 |
| 2019/0295540 A1* | 9/2019 | Grima | G10L 15/22 |
| 2019/0378493 A1* | 12/2019 | Kim | G10L 15/25 |

OTHER PUBLICATIONS

European Patent Office Application Serial No. 18187759.8, Search Report dated Feb. 11, 2019, 8 pages.

* cited by examiner (a)

(b)

(c)

(a)

(b)

(c)

(d)

ELECTRONIC DEVICE AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2018-0002931, filed on Jan. 9, 2018, the contents of which are hereby incorporated by reference herein in its entirety.

BACKGROUND OF THE INVENTION

1. Field of the Invention

The present disclosure relates to an electronic device capable of recognizing a voice.

2. Background of the Invention

Along with the recent development of hardware, an artificial intelligence technology which realizes a human thinking process, that is, cognition, reasoning, learning, and the like, with a computing technology has been remarkably advanced.

The artificial intelligence technology may be not only itself a research subject but may be directly or indirectly combined with other fields of computer sciences to provide various functions. In particular, an attempt to introduce artificial intelligence elements to various fields of information technology to utilize it to solve problems in the fields has been actively made.

Artificial intelligence techniques are classified into strong artificial intelligence and weak artificial intelligence. Strong artificial intelligence is a technology which may make human-like thinking and decision-making and which is at a level of self-study and self-judgment. Weak artificial intelligence is a technology at a level of providing optimal solutions by performing cognitive processes such as perception, reasoning, and the like, through a computational model.

Artificial intelligence may be classified into five core technologies: learning and reasoning technology, situation understanding technology, language understanding technology, visual understanding technology, recognition and cognitive technology. In recent years, artificial intelligent loudspeakers with a voice recognition function (or speech recognition function) corresponding to the language understanding technology have been released.

In recent years, speaker type electronic devices which recognize a user's voice and operate according to the recognized voice information have emerged. As the electronic devices are applied to the artificial intelligence technology, many changes have been made in users' life.

Thus, needs of users who want to be provided with various functions using such electronic devices have increased, and various functions related to the electronic devices have been developed according to the needs of users.

SUMMARY OF THE INVENTION

Therefore, an aspect of the detailed description is to provide an electronic device capable of recognizing voice information spoken before a wake-up word.

Also, another aspect of the detailed description is to provide an electronic device capable of recognizing a voice even without a wake-up word.

To achieve these and other advantages and in accordance with the purpose of this specification, as embodied and broadly described herein, an electronic device includes: a communication unit performing communication with a preset voice recognition server; a microphone receiving voice information; and a controller executing a specific function on the basis of voice information received through the microphone, wherein after voice information is received through the microphone, the controller determines whether a wake-up word is detected within a preset time, and when the wake-up word is detected within the preset time, the controller performs voice recognition on the voice information received before the wake-up word is detected, and when the wake-up word is not detected within the preset time, the controller does not perform voice recognition on the voice information received before the wake-up word is detected.

In an embodiment, the electronic device may further include: voice information representing the wake-up word including at least one of a frequency and a waveform related to the wake-up word, wherein the controller may determine whether the wake-up word is detected on the basis of whether the voice information representing the wake-up word and the voice information received through the microphone match.

In an embodiment, when the wake-up word is detected within the preset time, the controller may transmit the voice information received before the wake-up word is detected to a preset voice recognition server through a wireless communication unit.

In an embodiment, when the wake-up word is detected within the preset time, the controller may transmit only voice information satisfying a preset condition, among pieces of voice information received before the wake-up word is detected, to the preset voice recognition server.

In an embodiment, the preset condition may be a condition related to at least one of a condition related to a reception time point of the wake-up word and a condition related to a reception time point of a voice.

In an embodiment, after the wake-up word is detected, when voice information is received, the controller may execute a voice recognition function on the basis of voice information received before the wake-up word is detected and voice information received after the wake-up word is detected.

In an embodiment, the controller may process the voice information received before the wake-up word is detected and the voice information received after the wake-up word is detected, as single voice information, and perform voice recognition on the single processed voice information.

In an embodiment, after the voice information is received through the microphone, if the wake-up word is not detected within the preset time, the controller may not execute a voice recognition function.

In an embodiment, if the voice recognition function is not executed, the controller may not transmit the voice information received through the microphone to a preset voice server.

In an embodiment, after the voice information is received through the microphone, when the wake-up word is detected within the preset time, the controller may output notification information for a user to select whether to execute a voice recognition function.

In an embodiment, the electronic device may further include: a memory storing a plurality of pieces of category information set to execute a voice recognition function, wherein when voice information is received through the microphone before the wake-up word is detected, the controller may determine a category of the voice information, and when the determined category corresponds to any one of the plurality of pieces of category information included in the memory, the controller performs recognition on the voice information.

In an embodiment, different pieces of keyword information by categories and voice information corresponding to the different pieces of keyword information are stored in the plurality of pieces of category information, and the controller may determine a category of the voice information on the basis of a comparison result obtained by comparing the received voice information and voice information corresponding to the different pieces of keyword information.

In an embodiment, after recognition is performed on the voice information, if voice information is not received through the microphone during a preset time, the controller may output a response signal corresponding to voice information received before the wake-up word is detected through the microphone.

In an embodiment, the controller may store a result of determining a category of the voice information received through the microphone in the memory, and determine a plurality of pieces of category information set to execute the voice recognition function on the basis of the determination result stored in the memory.

In an embodiment, the controller may extract category information of a frequently uttered voice from the determination result, and set the extracted frequently used category information as category information set to execute the voice recognition function.

In an embodiment, the electronic device may further include: a memory storing voice sound information of a preset speaker, wherein when voice information received through the microphone before the wake-up word is detected and voice sound information of the preset speaker match, the controller may execute voice recognition on the voice information.

In an embodiment, when voice information is received through the microphone before the wake-up word is detected, the controller may extract context information from the received voice information, and determine whether to perform voice recognition on the voice information on the basis of the extracted context information.

To achieve these and other advantages and in accordance with the purpose of this specification, as embodied and broadly described herein, a method for controlling an electronic device having a microphone formed to receive voice information; receiving voice information through the microphone; determining whether a wake-up word is detected within a preset time, after the voice information is received; and when the wake-up word is detected as a result of determination, executing a voice recognition function to recognize the voice information received before the wake-up word is detected.

In an embodiment, the method may further include: first detecting the wake-up word before the voice information is received through the microphone; receiving voice information after the wake-up word is detected; and executing a voice recognition function on the voice information received after the wake-up word is detected.

In an embodiment, in the executing of the voice recognition function, the voice recognition function may be executed only on voice information satisfying a preset condition among voice information received before the wake-up word is detected.

In an embodiment, the preset condition may be a condition related to at least one of a condition related to a reception time point of the wake-up word and a condition related to a reception time point of a voice.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
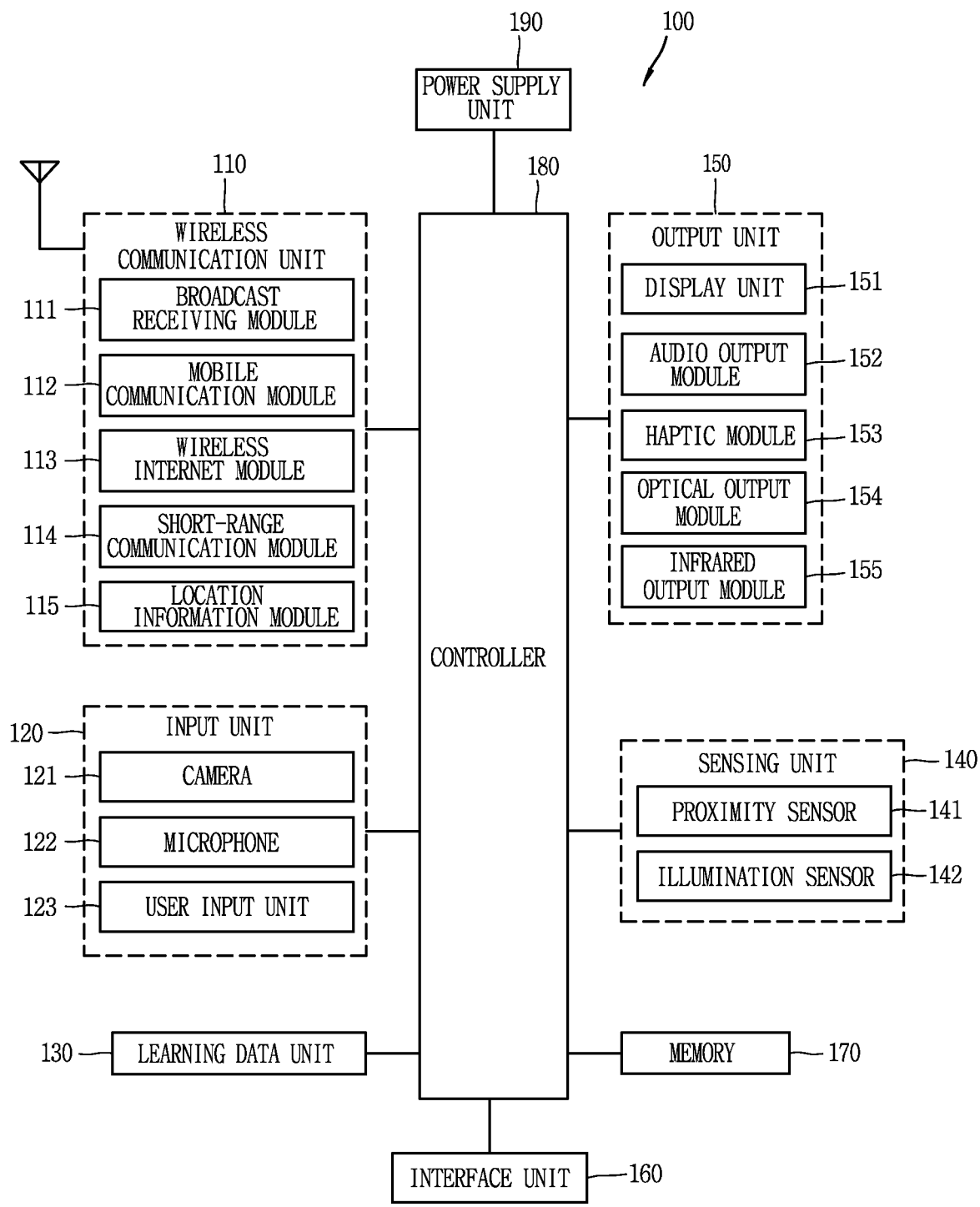
FIG. 1A is a block view illustrating an electronic device related to the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings. In the following description, explanations will be made in order in the clockwise direction based on the drawing in a right upper side.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
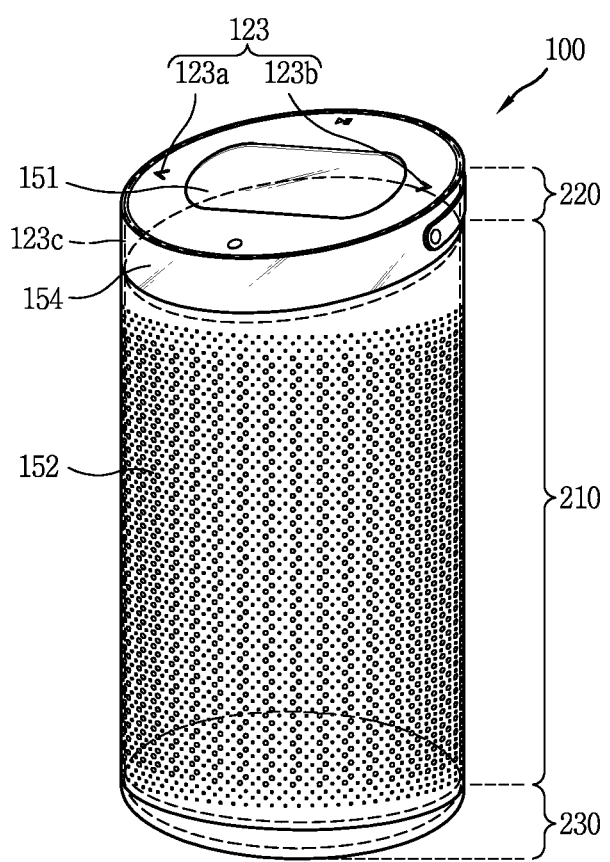
FIG. 1B is a perspective view of an electronic device according to an embodiment of the present disclosure.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The learning data unit 130 may include a memory integrated to or provided in a mobile terminal. In an embodiment, the learning data unit 130 may be implemented through the memory 170. However, without being limited thereto, the learning data unit 130 may be implemented in a memory (e.g., an external memory connected to the mobile terminal 100) related to the mobile terminal or may be implemented through a memory included in a server which can communicate with the mobile terminal 100. In another embodiment, the learning data unit 130 may be implemented through a memory maintained in a cloud computing environment or another remote memory accessible by a terminal through the same communication scheme as that of a network.

In order to identify, index, classify, manipulate, store, search, and output data used in generally supervised or unsupervised leaning, data mining, prediction analysis, or another machine learning technology, the learning data unit 130 is configured to store the data in at least one database. Information stored in the learning data unit 130 may be used by the controller 180 using at least one of different types of data analysis, machine learning algorithm, and machine learning technology or a plurality of controllers included in a mobile terminal. Examples of the algorithm and technique include a k-nearest neighbor system, fuzzy logic (e.g., possibility theory), neural networks, Boltzmann machines, vector quantization, pulsed neural nets, support vector machines, maximum margin classifiers, hill-climbing, inductive logic systems, bayesian networks, petri nets (e.g., finite state machines, mealy machines, moore finite state machines), classifier trees (e.g., perceptron trees, support vector trees, markov trees, decision tree forests, random forests), pandemonium models and systems, clustering, artificially intelligent planning, artificially intelligent forecasting, data fusion, sensor fusion, image fusion, reinforcement learning, augmented reality, pattern recognition, automated planning, and the like.

The controller 180 may determine or predict at least one executable operation of the mobile terminal on the basis of information determined or generated using data analysis, a machine learning algorithm, and a machine learning technology. To this end, the controller 180 may request, search, receive, or utilize data of the learning data unit 130. The controller 180 may perform various functions implementing a knowledge-based system, an inference system, a knowledge obtaining system, and the like, and may perform various functions including a system for uncertain inference (e.g., a fuzzy logic system), an adaptation system, a machine learning system, an artificial neural network, and the like.

The controller 180 may include sub-modules allowing for processing a voice and natural language such as an I/O processing module, an environment condition module, a speech-to-text (STT) processing module, a natural language processing module, a work flow processing module, a service processing module. Each of the sub-modules may have authority to access one or more systems, data and model, or a sub-set or super-set thereof in a mobile terminal. Here, targets, for which each of the sub-modules have authority to access, may include scheduling, a vocabulary index, user data, a task flow model, a service model, and an automatic speech translation (ASR) system. In another embodiment, the controller 180 or the mobile terminal may be implemented as the sub-module, system, or data and model.

In some embodiments, on the basis of data from the learning data unit 130, the controller 180 may be configured to detect and sense a user request on the basis of a user input, a context condition expressed by an input of a natural language, or a user intention. Also, the controller 180 may positively derive or obtain information required for completely determining a user request according to a context condition or a user intention. For example, the controller 180 may detect and sense a user request by analyzing past data including past input and output, patterning matching, an unambiguous word, an input intention, and the like. Also, the controller 180 may determine a work flow for executing a function requested by a user according to a context condition or a user intention. Also, the controller 180 may execute a work flow for satisfying user demand on the basis of a context condition or user intention.

In some embodiments, the controller 180 may implement a dedicated hardware element for a learning data process including memistor, memristors, a mutual conductance amplifier, a pulse type neural circuit, an artificial intelligent nano-technology system (e.g., an autonomous nano-machine), or an artificial intelligent quantum machine system (e.g., a quantum neural network), and the like. In some embodiments, the controller 180 may include a pattern recognition system such as a machine vision system, an audio recognition system, a handwriting recognition system, a data fusion system, a sensor fusion system, and a soft sensor. The machine vision system may include content-based image search, optical character recognition, augmented reality, egomotion, tracking, an optical flow, and the like.

The controller 180 may sense or receive information within a mobile terminal, surrounding environment information of the mobile terminal, or any other information through the sensing unit 140. Also, the controller 180 may receive a broadcast signal and/or broadcast-related information, a radio signal, wireless data, and the like, through the wireless communication unit 110. Also, the controller 180 may receive image information (or corresponding signal), audio information (or corresponding signal), data, or information input from a user, through an input unit.

The controller 180 may collect information, process and classify the collected information (e.g., a knowledge graph, a command policy, a personalized database, a conversation engine, etc.), and store the processed or classified information in the memory 170 or the learning data unit 130.

Also, regarding the learning data unit 130, when an operation of the mobile terminal is determined on the basis of data analysis, a machine learning algorithm, and a machine learning technology, the controller 180 may control the components of the mobile terminal to execute the determined operation. The controller 180 may execute the determined operation by controlling the mobile terminal on the basis of a control command.

In an embodiment, when a specific operation is performed, the controller 180 may analyze history information indicating performing of a specific operation through data analysis, the machine learning algorithm, and the machine learning technology, and update existing learned information on the basis of the analysis information. Thus, the controller 180 may enhance accuracy of future performance of the data analysis, the machine learning algorithm, and the machine learning technology based on updated information, together with the learning data unit 130.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, an electronic device including at least one of the components described above with reference to FIG. 1A will be described. FIG. 1B is a perspective view of an electronic device according to an embodiment of the present disclosure.

Referring to FIG. 1B, the electronic device 100 may include a user input unit 123, an audio output unit 152, and an optical output unit 154 on an outer surface of the body part 200. The user input unit 123 may be configured to receive a control command from a user, and may be provided alone or in plurality. Hereinafter, a plurality of user input units will be referred to as a first user input unit 123a, a second user input unit 123b, and a third user input unit 123c, respectively. Similarly, the optical output unit 154 may also be provided in plurality, which will be referred to as a first optical output unit 154a and a second optical output unit 154b. When the plurality of user input units and optical output units are referred to collectively, reference numerals 123 and 154 will be used.

The body part 200 may have a cylindrical shape and may serve as a soundbox by itself. A size of the body part 200 may be determined in consideration of design. Meanwhile, the shape of the body part 200 may be variously modified.

The body 200 may include a first region 210 forming a side surface of the cylinder, a second region 220 forming a bottom surface of the cylinder, and a third region 230 facing the second region 220 and forming another bottom surface. The second region 220 and the third region 230 may have the same area or different areas.

The first region 210 may be referred to as an outer surface and the second region 220 and the third region 230 may be referred to as an outer upper surface and an outer lower surface, but hereinafter, the first, second, and third regions will be used.

The first region 210 may include a third user input unit 123c, a second optical output unit, an infrared ray output unit, and an audio output unit 152. For example, the second optical output unit and the audio output unit 152 may be spaced apart from each other. Or, referring to FIG. 1B, at least a portion of the second optical output unit may have a layered structure with the audio output unit 152 and overlap each other. This may easily be modified by a design of a designer.

The second optical output unit and the audio output unit 152 may be formed to surround the first region 210 of the body part 200. Accordingly, the audio output unit 152 is configured to output sound in all directions with respect to the body part 200, and the second optical output unit may output light in all directions with respect to the body part 200.

The third user input unit 123c may be disposed at an upper end of the first region 210. The third user input part 123c may be formed to rotate around a central point of the body part 200. Accordingly, the user may increase or decrease the volume of the electronic device 100 by rotating the third user input unit 123c.

The infrared ray output unit may be disposed in a position where an infrared ray signal may be output in all directions. For example, the infrared ray output unit may be disposed at an upper end of the first region 210. In another example, as illustrated in FIG. 1B, the infrared ray output unit may be disposed in a rotatable region of an upper end of the first region 210. Accordingly, the infrared ray output unit may output an infrared ray signal so that the infrared ray signal may reach an external device located at a certain position. On the other hand, the position of the infrared ray output unit may be changed to a position where the infrared ray signal may be output in all directions by a design of a person skilled in the art.

The display unit 151, the first and second user input units 123a and 123b, the first optical output unit, and the temperature/humidity sensor may be disposed in the second region 220.

The display unit 151 may be disposed at the center of the second region 220 to secure the user's view. The first and second user input units 123a and 123b may be disposed in a peripheral region of the display unit 151 to receive user input.

The first and second user input units 123a and 123b may be formed as a button type so as to operate by a pressing operation or may be formed as a touch type so as to operate by a touch operation. The first and second user input units 123a and 123b may be configured to perform different functions. For example, the first user input unit 123a may be a button for inputting a control command for stopping voice recognition, and the second user input unit 123b may be a button for inputting a control command for turning on/off power.

The first optical output unit 154 may be formed along an outer periphery of the second region 220. That is, the first optical output unit 154 may have a band shape surrounding the outer periphery of the second region 220. For example, the first optical output unit may have the form of a band surrounding the circle when the second region 220 is circular.

The optical output unit may be formed to emit light from the light source. A light emitting diode (LED) may be used as the light source. The light source is located on the inner circumferential surface of the optical output unit, and light output from the light source passes through the optical output unit to illuminate the outside. The optical output unit is made of a transparent or semi-transparent material allowing light to be transmitted therethrough.

The optical output unit may output notification information related to an event which occurs in the electronic device 100, as light. For example, when voice recognition is being performed in the electronic device 100, the optical output unit may output red light. Further, when a correction command is awaited in the electronic device 100, the optical output unit may output yellow light.

The temperature/humidity sensor may be disposed in the second region 220 that may be in direct contact with the outside so as to sense ambient temperature and humidity.

Although not shown, a power supply unit 190 for receiving power from the outside, an interface 160 for transmitting/receiving data to/from an external device, and an audio input unit (microphone) for receiving sound, and the like, may be further disposed in the third region 230.

The electronic device 100 according to the present disclosure has been described above. Although the above description shows an arrangement structure of the components of the electronic device 100, the present disclosure is not limited thereto and the arrangement positions of the components may vary within a range that may be easily changed by those skilled in the art.

Figure 2:
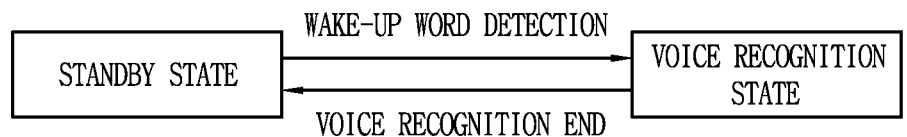
FIG. 2 is a conceptual view illustrating a method of operating in a first voice recognition mode.

Hereinafter, a method of performing voice recognition in the electronic device 100 related to the present disclosure will be described. FIG. 2 is a conceptual view illustrating a method of operating in the first voice recognition mode.

The electronic device 100 related to the present disclosure may include a general microphone or an always-on microphone. The always-on microphone is a microphone configured to receive voice information at low power when power is supplied to the electronic device. The electronic device 100 may always sense a voice uttered by the user through the always-on microphone 122 at any time. It will be obvious to those skilled in the art that the present disclosure may be implemented using a general microphone in addition to the always-on microphone.

Hereinafter, the always-on microphone 122 will be referred to as a microphone 122, and the microphone 122 may be understood as the always-on microphone 122 unless otherwise mentioned in the following description.

The electronic device 100 related to the present disclosure may execute the voice recognition function so that an operation of the electronic device may be controlled through voice recognition. Here, the voice recognition function is a function of converting an audio signal received through a sound sensor such as a microphone into a word or a sentence and generating a voice command for performing a specific operation based on the information converted into the word or sentence.

The controller 180 of the electronic device 100 may perform voice recognition based on a predetermined algorithm or may perform voice recognition using a predetermined voice recognition server. In the case of using the voice recognition server, the controller 180 may transmit voice information as voice recognition target to the voice recognition server through a wired or wireless network. The voice recognition server may analyze the voice information based on a predetermined voice recognition algorithm to generate a voice command corresponding to the voice information. The voice recognition server may then send the generated voice command to the electronic device 100. The electronic device may perform an operation of the voice information based on the voice command received from the voice recognition server. Hereinafter, it is assumed that the controller 180 performs voice recognition using the voice recognition server. However, the present disclosure is not limited thereto, and it may be obvious to a person skilled in the art that the controller may recognize a voice on the basis of the voice recognition algorithm provided in the controller itself.

Hereinafter, it is assumed that the voice recognition function is executed.

The controller 180 of the electronic device 100 according to the present disclosure may execute a voice recognition function in any one of a first voice recognition mode and a second voice recognition mode.

As for an execution state of the voice recognition function, the first voice recognition mode may have any one of a standby state (or an idle state) in which a start signal is sensed to start the voice recognition function and a voice recognition state in which voice recognition is performed by analyzing voice information.

The standby state may be set to sense a start signal for starting the voice recognition function. In the standby state, voice information may be received through the always-on microphone 122.

The start signal may be set to different voice information for each electronic device 100 or for each application providing a voice recognition function. For example, the start signal may be a voice signal corresponding to voice information of "Hey, Haniya". In this way, the start signal may be set in word form, which may be called a wake-up word.

When the wake-up word is sensed, the controller 180 may switch from the standby state to the voice recognition state. More specifically, the controller 180 determines whether or not the voice "Hey, Haniya" matches a predetermined start signal, and if the voice matches the predetermined start signal, the controller 180 may be switched from the standby state to the voice recognition state, and when the voice does not match the predetermined start signal, the controller 180 may maintain the standby state. For example, when the voice "Hey, Haniya" is received, the controller 180 may be converted into the voice recognition state in response to the voice signal "Hey, Haniya".

Here, the controller 180 does not recognize the voice "Hey, Haniya" but simply determines whether the voice matches the previously stored voice information. Here, the previously stored voice information may include at least one of a frequency and a waveform related to the wake-up word. Specifically, the controller 180 may determine whether a frequency and waveform of the voice information representing "Hey, Haniya" received via the microphone 122 matches the frequency and waveform of the previously stored voice information. If the voice information received via the microphone 122 matches the stored voice information, the controller 180 may determine that a wake-up word is detected.

Therefore, according to the present disclosure, voice recognition is not performed in the standby state and may be performed only in the voice recognition state Hereinafter, the term "voice is recognized" or "voice is analyzed" may be understood as a term including an operation of analyzing the meaning of voice information based on a voice recognition algorithm and generating a voice command according to the analysis result.

On the other hand, the term "it is determined whether or not a voice matches" or "voice is detected" may be understood as an operation of simply receiving a voice through the microphone without using a voice recognition algorithm and determining whether previously stored voice information (frequency or waveform) and voice information (frequency or waveform) of the received voice.

In this case, the meaning of the voice information received by the electronic device may not be analyzed and only whether a frequency or waveform matches may be determined. Therefore, the present disclosure does not perform semantic analysis on all voices, so that power may be efficiently used.

When the voice information is received in the voice recognition state, the controller 180 may recognize the received voice information through the voice recognition algorithm. For example, when the controller 180 receives a voice "What's the weather like today?" in the voice recognition state, the controller 180 may convert the voice to text to generate voice information. Then, the controller 180 may transmit the generated voice information to the predetermined voice recognition server. The predetermined voice recognition server may analyze the received voice based on the voice recognition algorithm, generate voice information "It's fine today" as a result of analysis, and transmit the generated voice information to the electronic device 100. The controller 180 of the electronic device 100 may output the generated voice information.

Meanwhile, as described above, the controller 180 transmits only the voice information received through the microphone 122 to the predetermined voice recognition server after the wake-up word is detected. That is, the controller 180 may perform voice recognition only on the voice information received after the detection of the wake-up word. On the other hand, the controller 180 may not perform voice recognition on voice information received through the microphone 122 in the standby state, that is, before the wake-up word is detected. Accordingly, the controller 180 may not transmit the voice information received through the microphone 122 to the predetermined voice recognition server before the wake-up word is detected.

On the other hand, in the first voice recognition mode, voice recognition is not performed on the voice information detected through the microphone 122 before the wake-up word is received. Hereinafter, the second voice recognition mode in which voice information detected through the microphone 122 before the wake-up word is received is recognized will be described.

Figure 3:
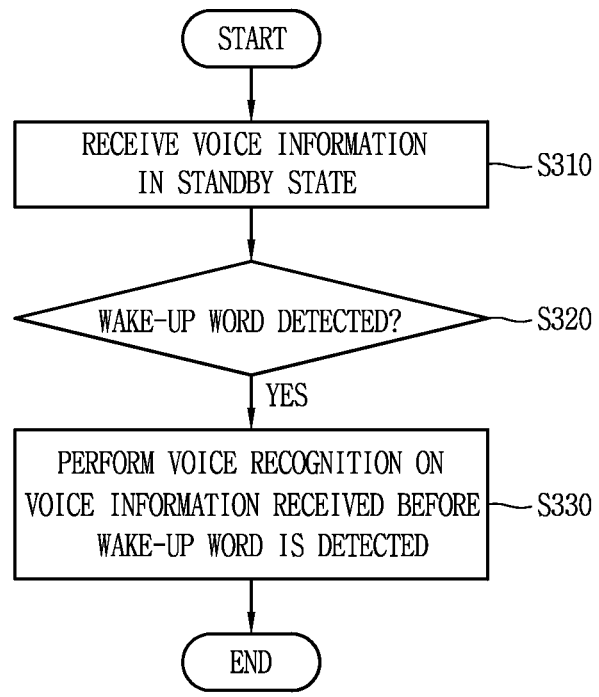
FIG. 3 is a flowchart illustrating a method of executing a second voice recognition mode.
Figure 4:
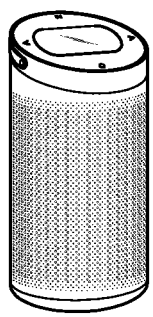
FIG. 4 is a conceptual view illustrating a state in which the second voice recognition mode of FIG. 3 is executed.
Figure 4:
Figure 4:
Figure 4:
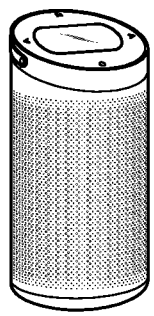
Figure 4:
Figure 4:
Figure 4:
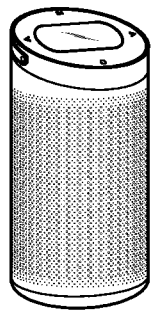
Figure 4:
Figure 4:

FIG. 3 is a flowchart illustrating a method of executing the second voice recognition mode, and FIG. 4 is a conceptual view illustrating a state in which the second voice recognition mode of FIG. 3 is executed.

The electronic device 100 according to the present disclosure may operate in the second voice recognition mode in response to a received user request. Hereinafter, it is assumed that the voice recognition function operates in the in the second voice recognition mode, and an operation method in the second voice recognition mode will be described with reference to the accompanying drawings.

Referring to FIG. 3, during operation in the second voice recognition mode, the controller 180 may receive voice information through the microphone 122 in a standby state before the wake-up word is received (S310).

The controller 180 may determine whether the received voice information matches the previously stored voice information (frequency or waveform information), rather than immediately performing voice recognition on the received voice information. That is, it may be determined whether or not a wake-up word is included in the received voice information. The controller 180 may not perform voice recognition when the received voice information does not include a wake-up word.

After receiving the voice information, the controller 180 may determine whether a wake-up word is detected (S320).

After receiving the voice information, when a wake-up word is detected within a preset time, the controller 180 may perform a voice recognition on the received voice information (S330). That is, the controller 180 may recognize the voice information based on the voice recognition algorithm. Here, the preset time may be previously set when the electronic devices released from the factory or may be set by the user. Preferably, the preset time may be set to a short time of about 2 to 3 seconds.

More specifically, if the wake-up word is detected within the preset time after receiving the voice information, the controller 180 may transmit the voice information received before detection of the wake-up word to the voice recognition server for voice recognition. To this end, the controller 180 temporarily stores the voice information received before the wake-up word is detected in a specific buffer, and then transmits the voice information to the voice recognition server after the wake-up word is detected.

That is, the memory 170 of the electronic device 100 according to the present disclosure may include the specific buffer for temporarily storing the voice information received from the always-on microphone 122. Here, if the wake-up word is not detected within the predetermined time based on a reception time of the voice information, the voice information stored in the specific buffer may be sequentially deleted in order of the oldest reception time of the voice information. Therefore, the present disclosure may improve the efficiency of the memory by deleting unnecessary information stored in the specific buffer in real time.

The controller 180 may receive response information on the voice information from the voice recognition server. Then, the controller 180 may operate the electronic device 100 based on the response information.

For example, as illustrated in (a) of FIG. 4, after receiving voice information 'What is today's weather?' in the standby state, the wake-up word "Haniya" may be received with the preset time. In this case, the controller 180 may perform voice recognition of the voice 'What's the weather like today?'. Also, as illustrated in (c) of FIG. 4, the controller 180 may output response information 'It's fine today' as analysis result information of the voice information. Therefore, the present disclosure may perform voice recognition even when the user who intends to execute the voice recognition function inputs voice information without first inputting the wake-up word.

When performing the voice recognition on the voice information received before the wake-up word is received, the controller 180 may perform voice recognition only on voice information which satisfies a preset condition, rather than on every voice information received before the wake-up word is received.

The preset condition may be a condition related to at least one of conditions related to a reception time of the wake-up word and a condition related to a reception time of the voice. More specifically, the preset condition may be a condition of voice information received within a predetermined time from reception of the wake-up word. Or, the preset condition may be a condition of a voice corresponding to a sentence most recently received based on a time at which the wake-up word is received.

For example, the controller 180 may perform voice recognition on voice information uttered before a predetermined time period based on a reception time point of the wake-up word. In another example, the controller 180 may perform voice recognition only on voice information corresponding to a most recently received sentence among voice information received before a start time of the wake-up word. That is, only a sentence uttered immediately before the wake-up word is uttered may be selectively recognized. Therefore, the controller 180 may perform voice recognition only on a specific voice desired by the user, rather than on all voices received through the always-on microphone 122.

Meanwhile, if the wake-up word is not detected within the predetermined time after receiving the voice information, the controller 180 may not perform voice recognition on the received voice information. In addition, if the wake-up word is not detected within the predetermined time, the controller 180 may delete the voice information stored in the specific buffer.

In the above, the method of analyzing the voice information when the wake-up word is received after receiving the voice information has been described. Accordingly, in the present disclosure, the electronic device may be controlled even without re-inputting a voice command although the user utters the wake-up word after attempting to input the voice command. Therefore, user convenience of using the electronic device having the voice recognition function may be improved.

Figure 5A:
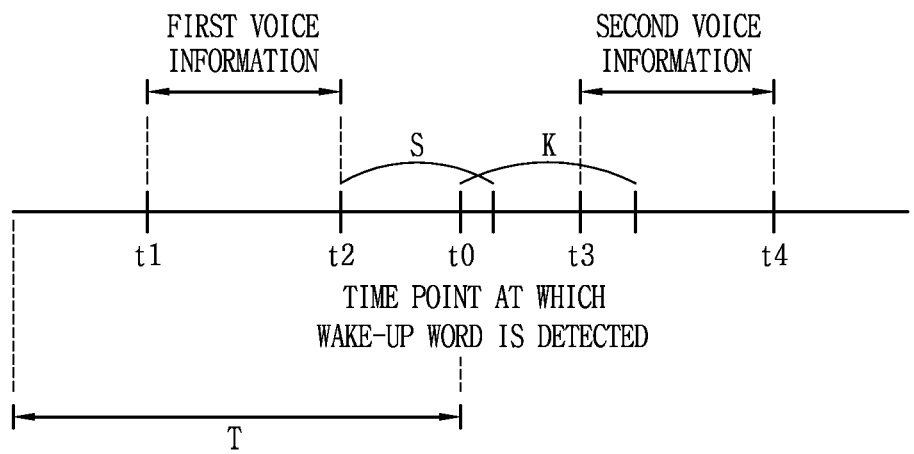
FIGS. 5A to 5C are conceptual views illustrating voice recognition targets according to a time at which voice information and a wake-up word are received.
Figure 5B:
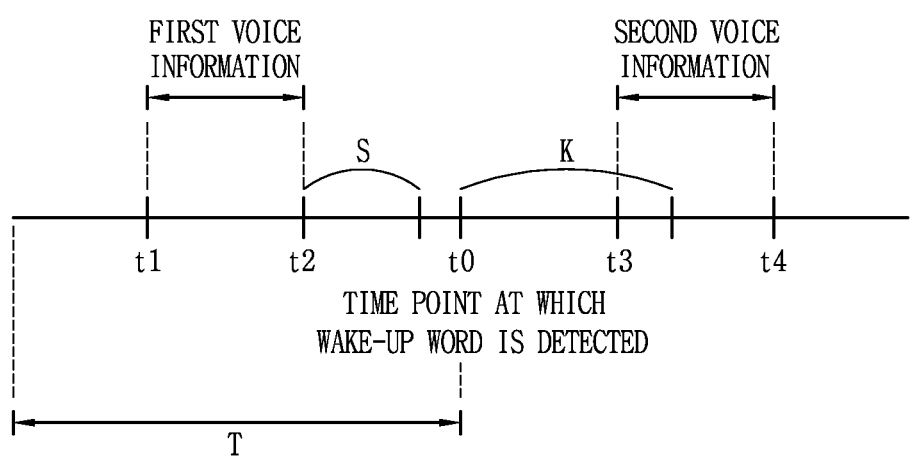
Figure 5C:
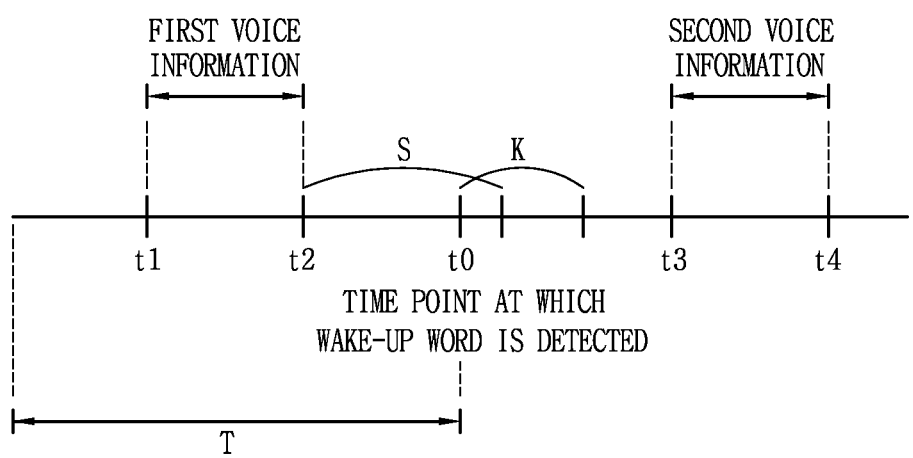
Figure 6:
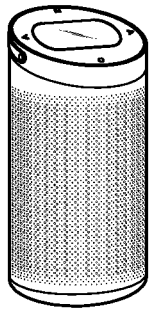
FIG. 6 is a conceptual view illustrating an embodiment of the operation of an electronic device when voice information is received before and after a wake-up word is detected.
Figure 6:
Figure 6:
Figure 6:
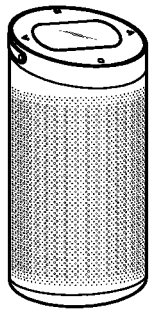
Figure 6:
Figure 6:
Figure 6:
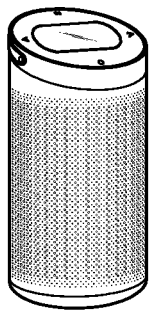
Figure 6:
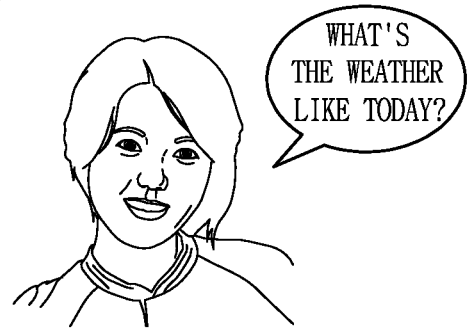
Figure 6:
Figure 6:
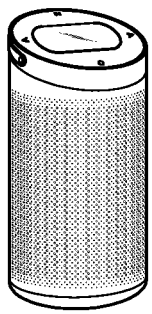
Figure 6:
Figure 6:

Hereinafter, a method of recognizing voice information when voice information is received before and after detection of a wake-up word will be described. FIGS. 5A to 5C are conceptual views illustrating a voice recognition target according to time of receiving voice information and a wake-up word. FIG. 6 is a conceptual view illustrating an embodiment of an operation of an electronic device when voice information is received before and after detection of a wake-up word.

The controller 180 of the electronic device 100 according to the present disclosure may detect voice information before and after the wake-up word is detected in the standby state. For example, as illustrated in FIG. 5A, the controller 180 may detect first voice information which starts to be received at a time point t1 which is before a time point t0 at which the wake-up word is detected, and may detect second voice information at time point t3 which is later than t0 at which the wake-up word is detected. For example, the controller 180 may receive the first voice information of "What is the weather today?" from the time point t1 to a time point t2.

Thereafter, the controller 180 may detect the wake-up word at the time point t0 during a first time period S after the first voice information reception end time point t2. For example, the controller 180 may detect a wake-up word "Haniya" at time point to. Here, the first time period S may be previously set for each voice recognition function driven in the electronic device.

In this case, the controller 180 may perform voice recognition on the voice information received during a preset time period T before the time point t0, based on the time point t0 at which the wake-up word is sensed. The preset time period T may be previously set in the electronic device (100). For example, referring to FIG. 5A, when the wake-up word is detected, the controller 180 may perform voice recognition of the first voice information detected during the preset time period T based on t0 as a time point at which the wake-up word is detected.

On the other hand, when the wake-up word is detected after the lapse of first time period S after the first voice information reception end time point t2, the controller 180 may not perform voice recognition on the first voice information. For example, as illustrated in FIG. 5B, when the wake-up word is detected at the time point t0 after the first time period S has elapsed based on the first voice information reception end time point t2, the controller 180 may not perform voice information on the first voice information. In this case, the controller 180 may perform voice recognition only the second voice information received after the wake-up word detection time point 0.

On the other hand, although not shown, a plurality of pieces of voice information may be received during the preset time period T. For example, the controller 180 may receive two pieces of voice information, i.e., "What is today's weather?" and "And rain?", during the preset time period T. In this case, the controller 180 may perform voice recognition on the plurality of pieces of voice information.

Further, although not shown, the controller 180 may not perform voice recognition on voice information received before the preset time period T.

Also, the controller 180 may perform voice recognition on voice information received after the wake-up word is detected. Here, the controller 180 may perform voice recognition only on voice information whose first syllable is received during a second time period K after the wake-up word detection time point to. Here, the second time period K may be a time period previously set in the voice recognition function driven in the electronic device, like the first time period S.

For example, as illustrated in FIG. 5A, the controller 180 may start receiving the second voice information at a time point t3 included the second time period K based on the detection time point 0 of the wake-up word. The second voice information may be received from a time point t3 to a time point t4. That is, the controller 180 does not perform voice recognition on all of the voice information received after the detection of the wake-up word but perform voice recognition on voice information which has started to receive during the second time period K after detection of the wake-up word.

If the voice information is not received during the second time period K, the controller 180 does not perform voice recognition and may enter the standby state again. For example, as illustrated in FIG. 5C, when the second voice information is received after the lapse of the second time period K based on the detection time point 0 of the wake-up word, the controller 180 may perform voice recognition on the first voice information detected before the wake-up word detection time point t0.

Alternatively, the controller 180 may perform voice recognition on the most recently received voice information before t2 and all of the voice information received after t2 based on the wake-up word detection time point t0. For example, the controller 180 may sequentially receive the first voice information and the second voice information before the time point t0, which is the detection time point of the wake-up word. At this time, the controller 180 may identify each voice information as sentences based on the time point to, and perform voice recognition only on the second voice information that is the most recently received voice information.

As described above, the electronic device may determine voice information as a target of voice recognition according to various conditions. The condition for performing voice recognition on certain voice information among voice information received before the detection time of the wake-up word may be set when the electronic device is released from the factory.

Hereinafter, it is assumed that the condition is set to perform voice recognition on voice information received during the preset time period T based on the time point t0.

Meanwhile, when voice information is received before or after the wake-up word detection time point, the controller 180 may perform voice recognition separately on the voice information received before and after the wake-up word detection time point. That is, the controller 180 may transmit the voice information received before and after the wake-up word detection time point to the voice recognition server in real time on a word-by-word basis. Thereafter, the voice recognition server may analyze the voice information of each word unit and transmit an analysis result to the electronic device 100.

On the other hand, the controller 180 may perform voice recognition on voice information received before and after the wake-up word detection time point, as one voice information. In this case, the controller 180 may determine the voice information received during a predetermined time period (for example, a general time required for uttering one sentence) before and after the wake-up word detection time point, as one voice information.

For example, referring to (a) and (b) of FIG. 6, after the user utters a voice of 'today', the user may utter the 'Haniya' as a wake-up word. As illustrated in (c) of FIG. 6, the user may successively utter a voice 'What's the weather like today?' after utterance of the wake-up word. In this case, the controller 180 may recognize the word and sentence 'today' and 'What's the weather like?' uttered during the predetermined time period before and after the wake-up word utterance time point, as one sentence.

That is, the voice recognition server may analyze voice information 'What's the weather like today?' and generates 'It's fine today' as response information. As illustrated in (d) of FIG. 6, when the response information 'It's fine today' is received, the electronic device 100 may output the response information through the audio output unit.

Therefore, according to the present disclosure, when the user speaks a wake-up word while attempting to input a voice command and subsequently continues to utter a sentence, voice information before and after utterance of the wake-up word is recognized as one voice information, thus improving accuracy of a semantic analysis of the voice information.

Hereinafter, an embodiment of outputting a result of performing voice recognition in the second voice recognition mode will be described.

When voice recognition is performed in the second voice recognition mode, the controller 180 may output response information as a result of voice recognition through the audio output unit. Here, the controller 180 may output the response information at a time when the user does not utter a voice. More specifically, when the response information is generated, the controller 180 may determine whether the user is uttering a voice. If the user's voice is not detected for a preset time, the controller 180 may determine that the user has terminated the voice utterance. In this case, the controller 180 may output the response information at the end of the voice utterance of the user.

For example, the controller 180 may receive voice information of 'What's the weather like today, Haniya?'. In this case, the controller 180 may generate response information regarding the voice information and determine whether or not the user utters a voice after the generation of the response information. When it is determined that the voice utterance of the user is finished, the controller 180 may output the response information 'It's fine today'.

On the other hand, after receiving the user's voice information, the controller 180 may receive new voice information. In this case, the controller 180 may limit outputting of the response information. For example, immediately after the voice information of 'What's the weather like today, Haniya?' is received, voice information of 'Also, tell me about weather and clothing information' may be received.

In this case, after the voice information of 'Also, tell me about weather and clothing information' is received, the controller 180 may output response information for each of the 'What's the weather like today?' and 'Also, tell me about weather and clothing information'. That is, the controller 180 may adjust an output time of the response information such that the voice utterance of the user and the response information of the electronic device 100 do not overlap each other. Thus, in the present disclosure, the convenience of controlling an operation the electronic device that controls an operation by voice may be enhanced.

After receiving the voice information, when the voice recognition function is detected within a preset time, the controller 180 may output notification information such that the user may select whether to execute the voice recognition function, rather than immediately executing the voice recognition function. For example, when the voice information of 'What's the weather like today, Haniya?' is received, the controller 180 may execute the second voice recognition mode. Here, the controller 180 may output notification information asking whether or not to execute voice recognition, instead of immediately executing voice recognition for 'What's the weather like today?'. Thus, in the present disclosure, rather than immediately performing voice recognition, the user's intention may be recognized one more time to perform the voice recognition function.

After outputting the notification information, when voice information (e.g., 'Yes') corresponding to a control command for starting voice recognition is received, the controller 180 may start voice recognition. Thereafter, the controller 180 may output the voice information 'It's fine today' as response information for the voice information.

In the above, the method of outputting a result of performing voice recognition after the voice recognition is performed in the second voice recognition mode has been described. Hereinafter, a method of performing voice recognition even without a wake-up word in the second voice recognition mode will be described.

Figure 7:
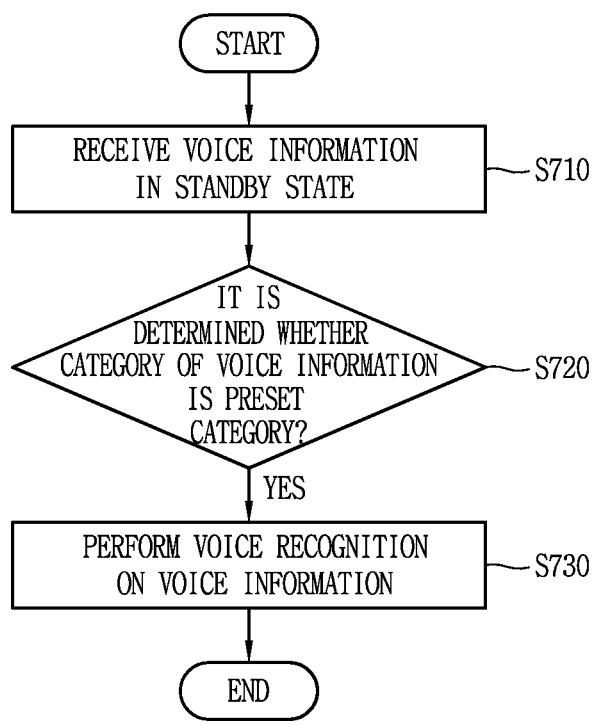
FIG. 7 is a flowchart illustrating a method of performing voice recognition even without a wake-up word in an electronic device according to the present disclosure.
Figure 8:
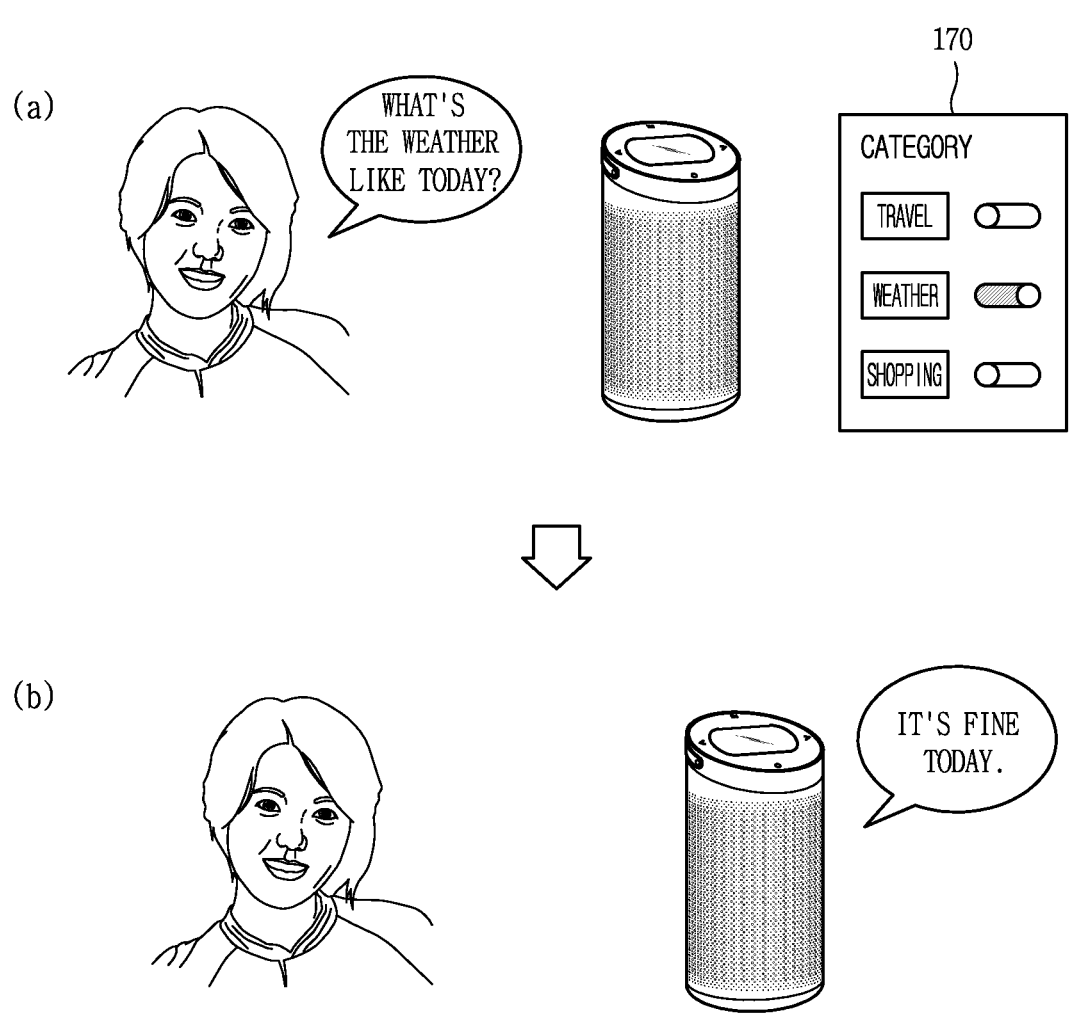
FIG. 8 is a conceptual view illustrating a control method of FIG. 7.

FIG. 7 is a flowchart illustrating a method of performing voice recognition without a wake-up word in an electronic device according to the present disclosure. FIG. 8 is a conceptual view illustrating the control method of FIG. 7.

The electronic device 100 according to the present disclosure may provide information related to a voice related to a topic frequently referred to by the user without a user request. This will be described in detail with reference to FIG. 9 hereinafter.

Referring to FIG. 7, the controller 180 may receive voice information in a standby state (S710). The received voice information may not include a wake-up word.

Here, the controller 180 may determine whether a category of the received voice information corresponds to a preset category (S720).

The memory 170 of the electronic device 100 according to the present disclosure may store a plurality of pieces of category information by subjects of the voice information. The category may be divided into topics of voice information such as a weather category, a travel category, and a shopping category, and the like. The controller 180 may set category information of at least one of the plurality of pieces of category information as category information that may start voice recognition immediately without a wake-up word.

The plurality of category information may be set based on a user selection or preset conditions. For example, the controller 180 may output a plurality of pieces of category information on the display unit 151 of the electronic device 100, and may set at least one category information as category information for starting voice recognition based on a touch input of the user. In another example, the controller 180 may classify voice information uttered by the user by categories and set frequently-uttered category information as category information for starting voice recognition. Therefore, regarding a category interested by the user, the present disclosure may conveniently provide related information, without a separate control command of the user.

In the plurality of pieces category information, keyword information for identifying a plurality of categories may be set. For example, keyword information such as lunch, dinner, meal, and the like, may be set in food category, and keyword information such as travel, train, airplane, and the like, may be set in the travel category.

Voice information (frequency or waveform) corresponding to the keyword information may be stored together in the plurality of pieces of category information. The controller 180 may compare the received voice information with voice information corresponding to the keyword information. If voice information corresponding to the keyword information exists, the controller 180 may determine that the voice information is voice information corresponding to the preset category.

If a category regarding food information is a preset category, the controller 180 may perform voice recognition on the voice information (S730). If the category regarding the voice information corresponds to a preset category in the standby state, the controller 180 may transmit the voice information to the voice recognition server for voice recognition. Then, the controller 180 may output the response information regarding the voice information.

For example, as illustrated in (a) of FIG. 8, when the voice information of 'What is the weather like today?' is received, the controller 180 may determine a category of the voice information. If the category of the voice information corresponds to weather as a predetermined category, the controller 180 may immediately perform voice recognition without detecting a wake-up word. That is, as illustrated in (b) of FIG. 8, the controller 180 may output response information 'It's fine today' as response information for voice information. That is, in the present disclosure, when a voice related to a subject that is frequently uttered or a voice with a high interest of the user is detected, without a wake-up word, related information may be automatically output.

In the above, the method of performing voice recognition using category information of voice without a wake-up word has been described. Hereinafter, a method of performing voice recognition according to a user's voice sound will be described.

The controller 180 of the electronic device 100 according to the present disclosure may be configured to perform voice recognition only for a sound uttered by a voice of a specific user, even without a wake-up word. At this time, the memory 170 may store voice sound information of the specific user, for example, information indicating features of the user's voice sound such as a height of a sound, intensity of a sound, a tone color, a frequency, and the like.

When a voice of sound information is received in the standby state, the controller 180 may determine whether the voice sound information of the voice information matches a previously stored voice. Here, if the voice sound of the voice information matches the previously stored voice sound information, the controller 180 may perform voice recognition without detecting a wake-up word. On the other hand, if the voice sound information of the voice information does not match the previously stored voice information, the controller 180 may not perform voice recognition.

On the other hand, although not shown, the controller 180 of the electronic device 100 according to the present disclosure may execute the voice recognition function based on a voice of the specific user and a category of the sound information. More specifically, when the sound information received in the standby state matches the previously stored voice and the category of the sound information corresponds to a preset category, the controller 180 may execute the voice recognition function. Thus, since the electronic device 100 does not operate by a non-authorized user's voice, security of the electronic device 100 may be strengthened and only information related to a category with a high interest among the authenticated user's voice may be provided.

Hereinafter, a method of performing voice recognition based on voice information of a plurality of users will be described.

The controller 180 of the electronic device 100 according to the present disclosure may receive conversation information between a plurality of users. In this case, the controller 180 may analyze the conversation information and may determine whether to perform voice recognition based on an analysis result.

More specifically, the controller 180 may determine whether or not a function that may be performed in the electronic device 100 exists based on context information of the conversation information. If the controller 180 determines that there is a function that may be performed, the controller 180 may perform voice recognition on the conversation information and output a result of the voice recognition.

For example, when the context of the conversation information ends with a negative answer to search for specific information, the controller 180 may not perform the voice recognition function. On the other hand, when the context of the conversation information ends with an affirmative answer to the search for specific information, the controller 180 may perform voice recognition on the conversation information without utterance of the wake-up word.

According to the present disclosure, when the wake-up word is detected after voice information is spoken, voice recognition is performed on voice information uttered before the wake-up word is detected, so that it is not necessary to re-input the voice information after the wake-up word is spoken, enhancing user convenience.

In addition, the present disclosure performs voice recognition of voice information corresponding to a specific topic among the voice information detected through the always-on microphone although the wake-up word is not detected, whereby information related to the topic frequently mentioned by the user may be automatically provided even without a separate control command of the user.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device comprising:
communication circuitry configured to perform communication with a voice recognition server;
a microphone configured to receive a first voice information; and
one or more processors configured to:
determine whether a wake-up word is received within a preset time, wherein the preset time begins after receiving the voice information; and
perform voice recognition on the received first voice information prior to the wake-up word based on the wake-up word being received within the preset time;
receive a second voice information within a second preset time and conversation information between a plurality of people, wherein the second preset time begins when the wake-up word is received;
determine whether a function that may be performed in the electronic device exists based on context information extracted from the received conversation information;
perform voice recognition on the received conversation information based on a determination that the function that may be performed in the electronic device exists;
transmit, to the voice recognition server via the communication circuitry, a portion of the received first voice information, the received second voice information and the received conversation information based on satisfying a preset condition and a determination that the function does not exist, wherein the preset condition corresponds to the wake-up word being received within the preset time and the received second voice information being received within received second preset time; and
execute a specific function based on the portion of the received first voice information and the received second voice information.

2. The electronic device of claim 1, wherein the received first voice information representing the wake-up word comprises at least a frequency or a waveform related to the wake-up word,
wherein the one or more processors are further configured to determine whether the wake-up word is received based on whether the frequency or waveform related to the wake-up word matches the received first voice information.

3. The electronic device of claim 1, wherein the one or more processors are further configured to perform no voice recognition on the received first voice information based on the wake-up word not being received within the preset time.

4. The electronic device of claim 1, wherein the one or more processors are further configured to transmit, to the voice recognition server via the communication circuitry, a first portion of the received first voice information based on the second voice information being received after a lapse of the second preset time and execute a first specific function based on the first portion of the received first voice information.

5. The electronic device of claim 1, wherein the first preset time or the second preset time are set by a user.

6. The electronic device of claim 1, wherein the transmitting the portion of the received first voice information and the received second voice information based on satisfying the preset condition is transmitted in real-time or on a word-by-word basis.

7. The electronic device of claim 6, wherein the one or more processors are further configured to:
combine the received first voice information received before the wake-up word and the received second voice information received after the wake-up word into a single voice information; and
transmit, to the voice recognition server via the communication circuitry, the single voice information.

8. The electronic device of claim 1, further comprising a memory, wherein the one or more processors are further configured to store a preset recording time duration of the received voice information in the memory.

9. The electronic device of claim 8, wherein the one or more processors are further configured to delete the preset recording time duration of the received first voice information when the wake-up word is not received within the preset time.

10. The electronic device of claim 1, wherein the one or more processors are further configured to output notification information comprising a selectable option to execute a voice recognition function when the wake-up word is received within the preset time.

11. The electronic device of claim 1, further comprising a memory configured to store a plurality of category information corresponding to voice recognition functions,
wherein the one or more processors are further configured to:
determine a category of the received first voice information; and
perform voice recognition on the received first voice information when the determined category corresponds to one of the plurality of category information stored at the memory.

12. The electronic device of claim 11, wherein:
the stored plurality of category information comprises categorized keywords and voice information corresponding to the categorized keywords; and
the one or more processors are further configured to determine a category of the received first voice information based on a comparison of the received first voice information and stored voice information corresponding to the categorized keywords.

13. The electronic device of claim 11, wherein the one or more processors are further configured to output a response corresponding to the received first voice information prior to the wake-up word when the second voice information is not received for the second preset time following the wake-up word.

14. The electronic device of claim 11, wherein the one or more processors are further configured to:
store a determined category of the received first voice information in the memory, and
perform voice recognition based on the determined category.

15. The electronic device of claim 14, wherein the one or more processors are further configured to determine the determined category by extracting category information of a frequently uttered voice command.

16. The electronic device of claim 1, further comprising:
a memory configured to store voice information of a preset speaker,
wherein the one or more processors are further configured to perform voice recognition on the received first voice information prior to the wake-up word when the received first voice information matches the stored voice information of the preset speaker.

17. The electronic device of claim 1, wherein the one or more processors are further configured to:
determine whether the context information extracted from the received conversation information ends with an affirmative answer; and
perform voice recognition on the received conversation information without utterance of the wake-up word based on a determination that the context information extracted from the received conversation information ends with the affirmative answer to a search for specific information.

* * * * *